(12) United States Patent
Yamauchi et al.

(10) Patent No.: US 11,590,937 B2
(45) Date of Patent: Feb. 28, 2023

(54) CLEANING DEVICES FOR VEHICLES, CLEANING SYSTEM FOR VEHICLES, AND CONTROL METHOD FOR CLEANING SYSTEM FOR VEHICLES

(71) Applicant: DENSO CORPORATION, Kariya (JP)

(72) Inventors: Yuusuke Yamauchi, Kariya (JP); Takahiro Aoyama, Kariya (JP)

(73) Assignee: DENSO CORPORATION, Kariya (JP)

( * ) Notice: Subject to any disclaimer, the term of this patent is extended or adjusted under 35 U.S.C. 154(b) by 91 days.

(21) Appl. No.: 17/052,966

(22) PCT Filed: May 30, 2019

(86) PCT No.: PCT/JP2019/021469
§ 371 (c)(1),
(2) Date: Nov. 4, 2020

(87) PCT Pub. No.: WO2020/003875
PCT Pub. Date: Jan. 2, 2020

(65) Prior Publication Data
US 2021/0237693 A1    Aug. 5, 2021

(30) Foreign Application Priority Data

Jun. 26, 2018  (JP) .............................. JP2018-121197
Jan. 10, 2019  (JP) .............................. JP2019-002569

(51) Int. Cl.
*B60S 1/56*      (2006.01)
*B08B 1/00*      (2006.01)
(Continued)

(52) U.S. Cl.
CPC .............. *B60S 1/566* (2013.01); *B08B 1/006* (2013.01); *B08B 3/02* (2013.01); *B08B 13/00* (2013.01); *B60S 1/04* (2013.01); *B60S 1/481* (2013.01)

(58) Field of Classification Search
None
See application file for complete search history.

(56) References Cited

U.S. PATENT DOCUMENTS

| 3,114,168 A | 12/1963 | Taylor |
| 2016/0339875 A1 | 11/2016 | Ina et al. |
| 2019/0270432 A1 | 9/2019 | Ina |

FOREIGN PATENT DOCUMENTS

| DE | 27 38 700 A1 | 3/1979 |
| DE | 38 42 375 A1 | 7/1989 |

(Continued)

OTHER PUBLICATIONS

Google Patents translation of DE2738700A1 retrieved from https://patents.google.com/patent/DE2738700A1/en?oq=de2738700 on Jul. 16, 2022 (Year: 2022).*

(Continued)

*Primary Examiner* — Eric W Golightly
(74) *Attorney, Agent, or Firm* — Oliff PLC

(57) ABSTRACT

A vehicle cleaning device removes an extraneous object collected on a cleaning subject of a vehicle. The vehicle cleaning device includes: a cleaning liquid supply device mounted on the vehicle; and a wiper device including a wiper driver and a wiper blade. The wiper driver includes a linear movement portion that produces a linear movement based on supply of a cleaning liquid that is pressure-fed from the cleaning liquid supply device, and a movement converter that converts the linear movement into a pivoting movement. The wiper blade is arranged to be contactable with the cleaning subject. The wiper device is configured to cause the wiper blade to perform a reciprocal wiping operation based on the pivoting movement of the movement converter.

8 Claims, 10 Drawing Sheets

(51) Int. Cl.
     *B08B 3/02*      (2006.01)
     *B08B 13/00*     (2006.01)
     *B60S 1/04*      (2006.01)
     *B60S 1/48*      (2006.01)

(56) References Cited

FOREIGN PATENT DOCUMENTS

| | | |
|---|---|---|
| JP | S49-35975 U | 3/1974 |
| JP | H04-57469 U | 5/1992 |
| JP | 2006-176028 A | 7/2006 |
| JP | 2008-068701 A | 3/2008 |
| JP | 2018-037100 A | 3/2018 |

OTHER PUBLICATIONS

Google Patents translation of DE3842375A1 retrieved from https://patents.google.com/patent/DE3842375A1/en?oq=DE+3842375+ on Jul. 16, 2022 (Year: 2022).*
Aug. 20, 2019 Search Report issued in International Patent Application No. PCT/JP2019/021469, 4 pages.

* cited by examiner

CLEANING DEVICES FOR VEHICLES, CLEANING SYSTEM FOR VEHICLES, AND CONTROL METHOD FOR CLEANING SYSTEM FOR VEHICLES

CROSS-REFERENCE TO RELATED APPLICATIONS

This application is based upon and claims the benefit of priority from prior Japanese Patent Application No. 2018-121197, filed on Jun. 26, 2018, and Japanese Patent Application No. 2019-2569, filed on Jan. 10, 2019, the entire contents of which are incorporated herein by reference.

TECHNICAL FIELD

The present disclosure relates to a vehicle cleaning device that cleans a cleaning subject of a vehicle, a vehicle cleaning system, and a method for controlling a vehicle cleaning system.

BACKGROUND ART

In accordance with recent progress in advanced driving assistance and autonomous driving technique of a vehicle, an increasing number of sensors is used to recognize states around the vehicle (for example, refer to Patent Document 1). A known example of such sensors is a ranging system that uses an optical sensor, that is, light detection and ranging or laser imaging detection and ranging (LIDAR) that transmits and receives light between the vehicle and an object to measure the distance between them.

A sensor that recognizes states around the vehicle has a sensing surface (e.g., external surface such as lens or cover glass) exposed to the outside of the vehicle. In the above-described ranging system and the like, when extraneous objects such as raindrops or dirt collect on the sensing surface of the sensor, the ranging accuracy may be decreased due to the extraneous objects located in the optical path of the optical sensor.

In this regard, techniques for spraying air (atmospheric gas), a cleaning liquid, or a gas-liquid mixture fluid obtained by mixing the air and the cleaning liquid onto the sensing surface of a sensor (for example, refer to Patent Document 2) have been considered and developed to remove extraneous objects from the sensing surface and clean the sensing surface.

PRIOR ART DOCUMENTS

Patent Documents

Patent Document 1: Japanese Laid-Open Patent Publication No. 2018-37100
Patent Document 2: Japanese Laid-Open Patent Publication No. 2016-222074

SUMMARY OF THE INVENTION

Extraneous objects may remain on the sensing surface of the sensor, for example, when the extraneous objects are firmly collected on the sensing surface. In this case, the ranging accuracy may be affected. Therefore, there is a need to more reliably remove the extraneous objects from the sensing surface to clean the sensing surface. In addition to sensors, this concept has been applied to cleaning subjects located at various positions of the vehicle. An example of a cleaning subject is an onboard camera because image recognition of the onboard camera may be affected.

It is an objective of the present disclosure to provide a vehicle cleaning device, a vehicle cleaning system, and a method for controlling a vehicle cleaning system that more reliably remove an extraneous object from a cleaning subject of a vehicle to clean the cleaning subject.

To achieve the above objective, a first aspect of the present disclosure is a vehicle cleaning device (21, 22, 120a, 120b) that removes an extraneous object collected on a cleaning subject (11, 12, 16, 17, 18, 106 to 108, 115, 116) of a vehicle (10, 101). The vehicle cleaning device includes a cleaning liquid supply device (13, 110) mounted on the vehicle and a wiper device (W1, W2) including a wiper driver (31, 124a, 124b) and a wiper blade (32, 123). The wiper driver includes a linear movement portion (35, 36, 41, 125b, 125c) that produces a linear movement based on supply of a cleaning liquid (Ws) that is pressure-fed from the cleaning liquid supply device (13, 110) and a movement converter (37, 40, 130, 132) that converts the linear movement into a pivoting movement. The wiper blade is arranged to be contactable with the cleaning subject. The wiper device is configured to cause the wiper blade to perform a reciprocal wiping operation based on the pivoting movement of the movement converter.

According to the above aspect, the vehicle cleaning device includes a wiper device. The wiper device includes a wiper driver that is actuated based on supply of a cleaning liquid pressure-fed from a cleaning liquid supply device mounted on a vehicle. The wiper driver includes a linear movement portion that produces a linear movement based on the supply of the cleaning liquid. The wiper driver further includes a movement converter that converts the linear movement into a pivoting movement. The wiper driver causes a wiper blade to perform a reciprocal wiping operation based on the converted pivoting movement. That is, the wiper blade performing the wiping operation directly scrapes and removes extraneous objects from a cleaning subject of the vehicle. Thus, the cleaning subject is reliably cleaned.

A second aspect of the present disclosure is a vehicle cleaning system that removes an extraneous object collected on a cleaning subject of a vehicle. The vehicle cleaning system includes a vehicle cleaning device and a controller (50, 51, 52, 150, 151, 152). The vehicle cleaning device includes a cleaning liquid supply device mounted on the vehicle, an ejection nozzle, a wiper device, and a switch. The ejection nozzle ejects a cleaning liquid that is pressure-fed from the cleaning liquid supply device to the cleaning subject. The wiper device includes a wiper blade arranged in contact with the cleaning subject and a wiper driver that causes the wiper blade to perform a wiping operation based on a supply pressure of the cleaning liquid from the cleaning liquid supply device. The switch switches supply of the cleaning liquid pressure-fed from the cleaning liquid supply device to the ejection nozzle or to the wiper driver. The controller controls the cleaning liquid supply device and the switch to control an ejection of the cleaning liquid and the wiping operation of the wiper blade.

A third aspect of the present disclosure is a method for controlling a vehicle cleaning system that removes an extraneous object collected on a cleaning subject of a vehicle. The vehicle cleaning system includes a vehicle cleaning device. The vehicle cleaning device includes a cleaning liquid supply device mounted on the vehicle, an ejection nozzle, a wiper device, and a switch. The ejection nozzle ejects a cleaning liquid pressure-fed from the cleaning liquid supply device to the cleaning subject. The wiper device includes a wiper blade arranged in contact with the cleaning subject and a wiper driver that causes the wiper blade to perform a wiping operation based on a supply pressure of the cleaning liquid from the cleaning liquid supply device. The switch switches the supply of the cleaning liquid pressure-fed from the cleaning liquid supply device to the ejection nozzle or to the wiper driver. The method includes controlling the cleaning liquid supply device and the switch to control an ejection of the cleaning liquid and the wiping operation of the wiper blade.

According to the second and third aspects, the vehicle cleaning device includes an ejection nozzle that ejects and supplies a cleaning liquid pressure-fed from a cleaning liquid supply device to a cleaning subject and a wiper device that receives a supply pressure of the cleaning liquid and drives a wiper driver to cause a wiper blade to perform a wiping operation. A switch switches the supply destination of the cleaning liquid to the ejection nozzle or to the wiper driver, so that the ejection and supply of the cleaning liquid and the wiping operation of the wiper blade are appropriately selected. Thus, more reliable removing and cleaning, which include the wiping operation of the wiper blade, are performed on extraneous objects collected on the cleaning subject of the vehicle.

BRIEF DESCRIPTION OF THE DRAWINGS

The above objectives and other objectives of the present disclosure and aspects and advantages of the present disclosure will become apparent from the following description, taken in conjunction with the accompanying drawings. In the drawings.

MODES FOR CARRYING OUT THE INVENTION

First Embodiment

A first embodiment of a vehicle cleaning device will be described below.

Figure 1:
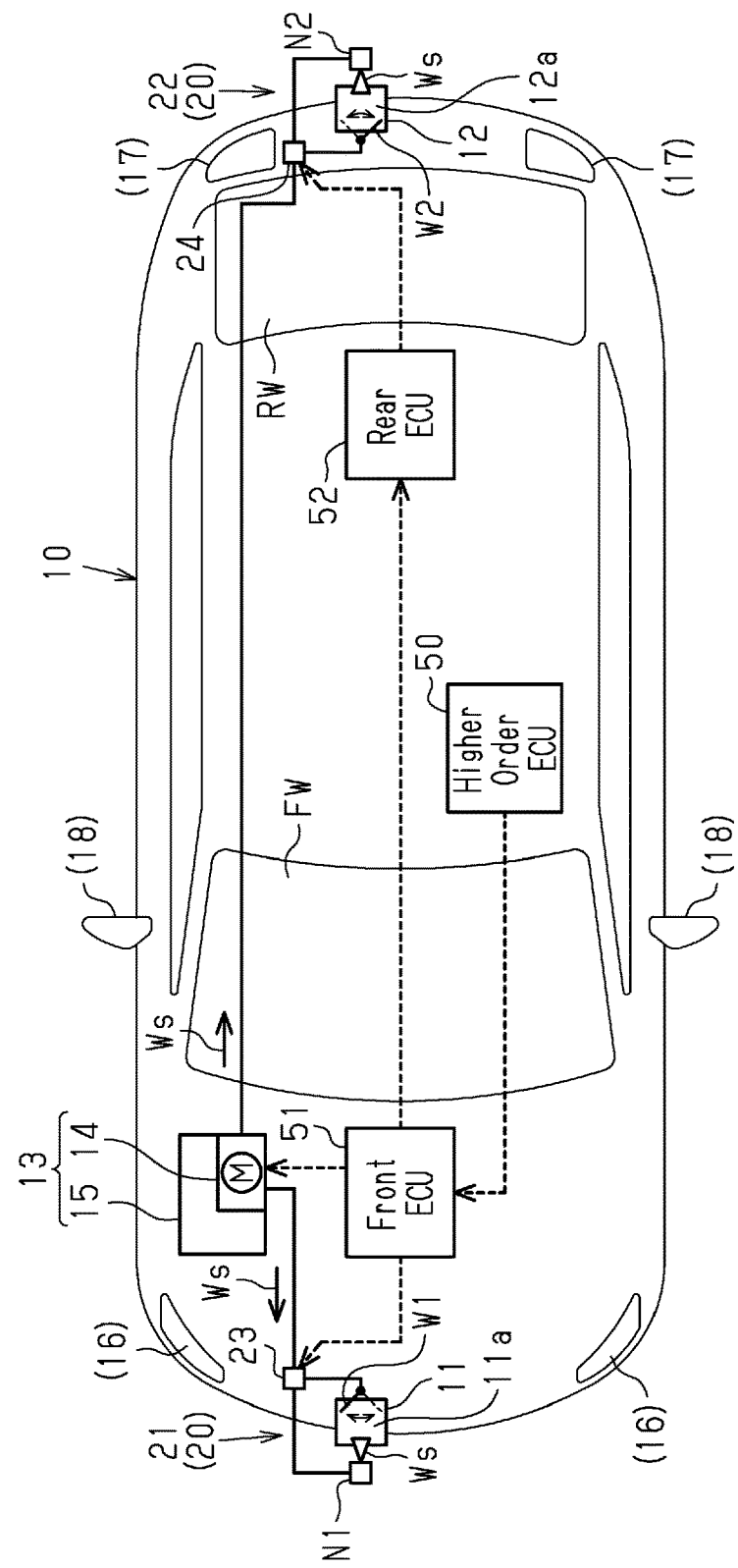
FIG. 1 is a configuration diagram of a vehicle on which a first embodiment of a vehicle cleaning device is mounted.

FIG. 1 shows a vehicle 10 having a front end central portion provided with a first ranging sensor 11 and a rear end central portion provided with a second ranging sensor 12. Each of the first and second ranging sensors 11 and 12 includes an optical sensor that transmits and receives light having a predetermined wavelength toward the corresponding one of the front and the rear of the vehicle 10. Each of the first and second ranging sensors 11 and 12 is used in a ranging system (e.g., LIDAR) that measures the distance between the vehicle and the corresponding one of a front subject and a rear subject and is used in a system that performs advanced driving assistance or autonomous driving of the vehicle 10.

The first and second ranging sensors 11 and 12 respectively have sensing surfaces 11a and 12a (e.g., external surface such as lens or cover glass) exposed to the outside of the vehicle 10. More specifically, because extraneous objects such as raindrops or dirt may collect on the sensing surfaces 11a and 12a and decrease the ranging accuracy, a vehicle cleaning system 20 is mounted on the vehicle 10 to remove the extraneous objects from the sensing surfaces 11a and 12a and clean the sensing surfaces 11a and 12a.

The vehicle cleaning system 20 includes first and second cleaning devices 21 and 22 as a vehicle cleaning device. The first cleaning device 21 cleans the first ranging sensor 11 arranged on the front end central portion of the vehicle 10. The second cleaning device 22 cleans the second ranging sensor 12 arranged on the rear end central portion of the vehicle 10. The first and second cleaning devices 21 and 22 respectively include ejection nozzles N1 and N2 that eject and supply a cleaning liquid Ws to the sensing surfaces 11a and 12a of the ranging sensors 11 and 12 and wiper devices W1 and W2 that are in contact with the sensing surfaces 11a and 12a and wipe substantially the entirety of the sensing surfaces 11a and 12a. The wiper devices W1 and W2 of the present embodiment are actuated based on a supply pressure of the cleaning liquid Ws.

A washer device 13 is typically mounted on the vehicle 10 as a cleaning liquid supply device. The washer device 13 stores the cleaning liquid Ws in a tank 15 and drives a washer pump 14 using an electric motor as a drive source to pressure-feed the cleaning liquid toward ejection nozzles, which are not shown in the drawings, so that the cleaning liquid Ws is supplied to external surfaces of windows FW and RW. The ejection nozzles are arranged for the front window FW and the rear window RW. In the present embodiment, the cleaning liquid Ws that is pressure-fed from the washer device 13 is also supplied to the cleaning devices 21 and 22.

Figure 2:
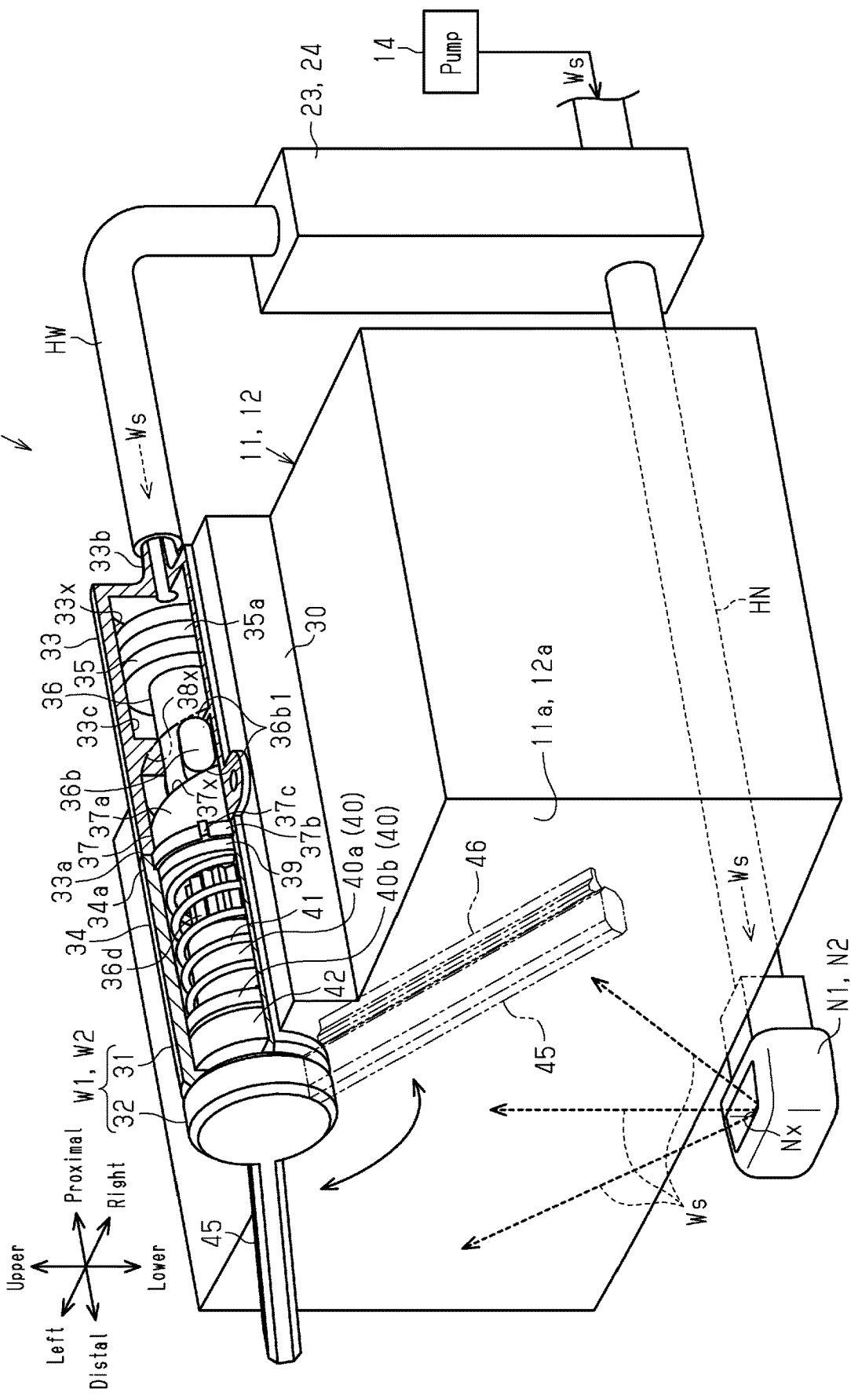
FIG. 2 is a perspective view showing configurations and operation of the vehicle cleaning device shown in FIG. 1.

As shown in FIG. 2, in the present embodiment, the first and second ranging sensors 11 and 12 are rectangular-box-shaped, and the sensing surfaces 11a and 12a are rectangular and elongated sideward. The ranging sensors 11 and 12 are arranged so that the long sides of the sensing surfaces 11a and 12a extend in the lateral direction of the vehicle 10.

The ejection nozzles N1 and N2 of the first and second cleaning devices 21 and 22 are arranged, for example, on a central portion of the sensing surfaces 11a and 12a in the lateral direction at a lower side (lower side in gravitational direction) of the sensing surfaces 11a and 12a in the vertical direction of the vehicle 10. Each of the ejection nozzles N1 and N2 includes an ejection port Nx directed upward. The cleaning liquid Ws is supplied from the ejection ports Nx to appropriate positions of the sensing surfaces 11a and 12a. The ejection nozzles N1 and N2 are connected by a nozzle side hose HN to respective switch valves 23 and 24, which correspond to a switch.

The switch valves 23 and 24 are connected by a wiper side hose HW to the respective wiper devices W1 and W2. The switch valves 23 and 24 are electrically-controllable electromagnetic valves. More specifically, the switch valves 23 and 24 are actuated to switch the supply destination of the cleaning liquid Ws pressure-fed from the washer pump 14 to the ejection nozzles N1 and N2 or to the wiper devices W1 and W2 or to stop the supply of the cleaning liquid Ws.

The wiper devices W1 and W2 of the first and second cleaning devices 21 and 22 are arranged, for example, on a laterally central portion of the respective sensing surfaces 11a and 12a at an upper side (upper side in gravitational direction) of the sensing surfaces 11a and 12a and are integrally coupled to a fixing portion 30 arranged on the upper surface of the ranging sensors 11 and 12. Each of the wiper devices W1 and W2 includes a rod-shaped wiper driver 31 and a wiper blade 32 attached to an end of the wiper driver 31 in an axial direction of the rod (hereafter, simply referred to as the axial direction) of the wiper driver 31. The wiper devices W1 and W2 have the same configuration. The specific configuration and operation of the wiper devices W1 and W2 will be collectively described below.

Figure 6:
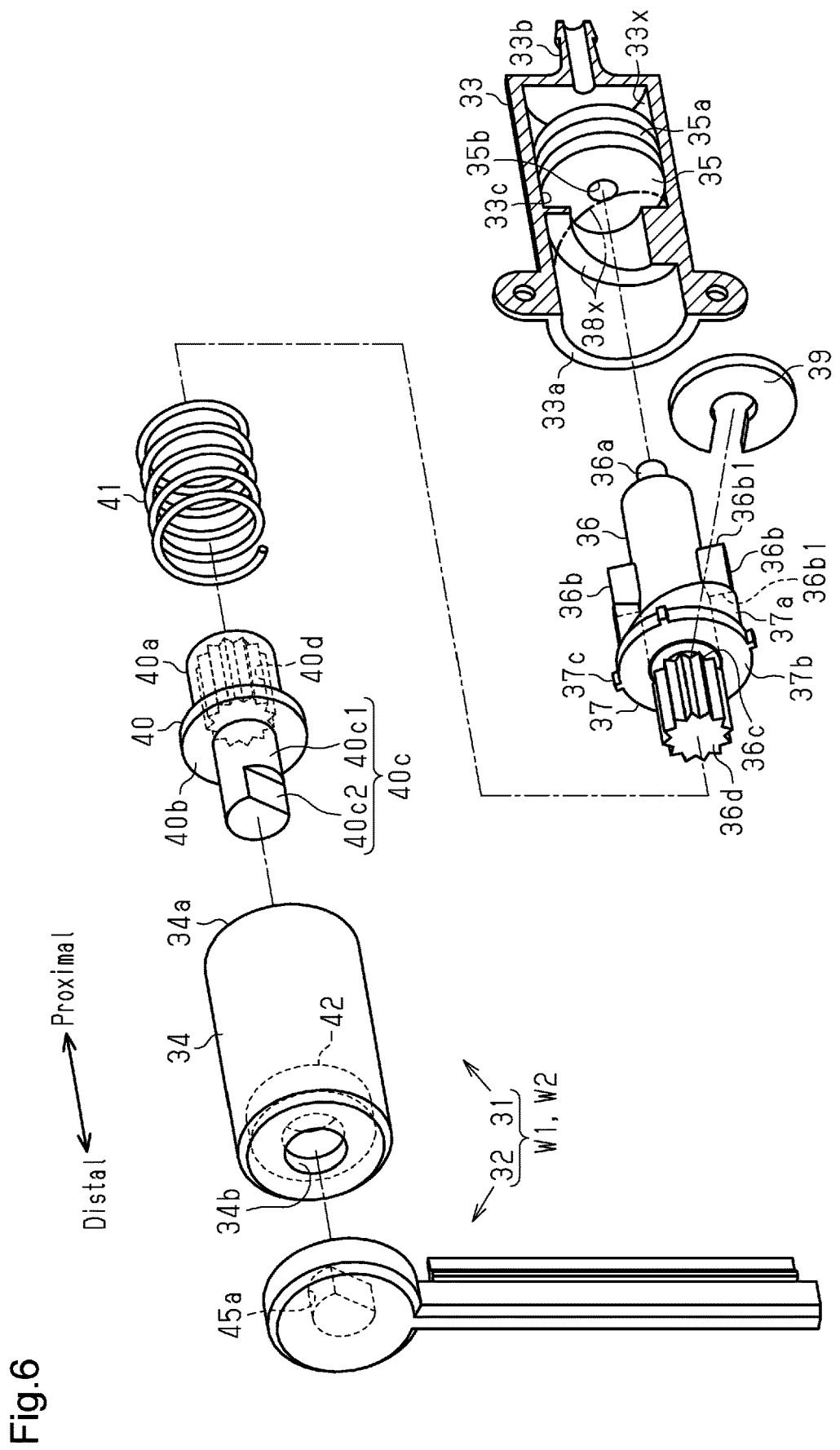
FIG. 6 is a perspective view showing configurations and operation of the vehicle cleaning device shown in FIG. 2.

As shown in FIGS. 2 and 6, in each of the wiper devices W1 and W2, the wiper driver 31 includes first and second accommodation cases 33 and 34 having a shape of a circular tube and a substantially closed end. The first accommodation case 33 forms a proximal half of the wiper driver 31 in the axial direction. The second accommodation case 34 forms a distal half of the wiper driver 31 in the axial direction. The accommodation cases 33 and 34 are arranged so that openings 33a and 34a in the accommodation cases 33 and 34 are opposed to each other. A hose connector 33b having a shape of a circular tube and configured to be connected to the wiper side hose HW is arranged on a central portion of the end wall of the first accommodation case 33 located at the proximal end of the wiper driver 31. The cleaning liquid Ws flows into the first accommodation case 33 through the hose connector 33b.

The first accommodation case 33 includes an accommodation space 33c having a continuous circular cross section in the axial direction. The accommodation space 33c accommodates a discoid piston 35 so that the piston 35 is movable in the axial direction. More specifically, the piston 35 and the accommodation space 33c in the first accommodation case 33 form an inflow chamber 33x into which the cleaning liquid Ws flows. When receiving pressure from the cleaning liquid Ws flowing into the inflow chamber 33x, the piston 35 moves toward the distal end in the axial direction. A packing 35a is attached to an outer circumferential surface of the piston 35, which is in contact with an inner wall surface of the first accommodation case 33, to limit leakage of the cleaning liquid Ws to the outside of the inflow chamber 33x. The piston 35 is actuated integrally with a shaft member 36 in the axial direction. The piston 35 and the shaft member 36 are used as a linear movement portion.

The shaft member 36 is rod-shaped and includes an insertion projection 36a projecting from the center of a proximal surface in the axial direction. The insertion projection 36a is loosely fit into an insertion hole 35b formed in a central portion of the piston 35. The shaft member 36 has a coupling structure so that the shaft member 36 is movable in the axial direction together with the piston 35 and is rotatable relative to the piston 35.

The shaft member 36 includes two guide projections 36b arranged on a longitudinal central portion of the outer surface. The guide projections 36b are located at opposite sides of the axis of the shaft member 36. Each guide projection 36b includes a side surface 36b1 that is located at the proximal side in the axial direction of the shaft member 36 and a side surface 36b1 that is located at the distal side in the axial direction of the shaft member 36. The two side surfaces 36b1 have arcuate curved surfaces that are in contact with respective inclined portions 37x and 38x, which will be described later.

The shaft member 36 includes a distal portion including a small diameter part 36c having a smaller diameter than a main body part and a distal coupling portion 36d located at a distal side of the small diameter part 36c. The distal coupling portion 36d includes ridges arranged in the circumferential direction at equal intervals. Each ridge extends in the axial direction and has, for example, a triangular cross section. The portion of the shaft member 36 located at a distal side of the guide projections 36b is inserted through a conversion member 37 having a shape of a circular tube.

The conversion member 37 includes a tube 37a having a shape of a circular tube and a flange-shaped attachment portion 37b located at a distal side of the tube 37a. The tube 37a extends toward the proximal end from the attachment portion 37b. The conversion member 37 is attached when the attachment portion 37b is held between the openings 33a and 34a of the first and second accommodation cases 33 and 34. The attachment portion 37b has an outer circumferential surface including engagement projections 37c that engage the opening 34a of the second accommodation case 34 and are used as a rotation stopper. When the conversion member 37 is attached to the accommodation cases 33 and 34, the tube 37a is inserted into the first accommodation case 33.

The tube 37a includes a proximal end surface including two inclined portions 37x having an identical inclined shape on each half of the circumference (only one inclined portion is shown in FIGS. 2 and 6). Each inclined portion 37x is inclined so that the inclined portion 37x moves from the proximal side toward the distal side in the axial direction when advanced in the clockwise direction as viewed from the proximal side to the distal side of the wiper driver 31 in the axial direction. The two guide projections 36b are respectively in contact with the two inclined portions 37x.

Two inclined portions 38x are formed integrally with the first accommodation case 33 in the accommodation space 33c and are axially opposed to the inclined portions 37x of the conversion member 37. The inclined portions 38x have an identical shape on each half of the circumference. The inclined portions 38x may be components separate from the first accommodation case 33 and may be configured to be coupled. The inclined portions 38x are inclined so that the inclined portions 38x are parallel to the inclined portions 37x of the conversion member 37. More specifically, the guide projections 36b of the shaft member 36 are guided between the inclined portions 37x and 38x, so that an axial linear movement of the shaft member 36 is converted into rotation movement.

The small diameter part 36c and the distal coupling portion 36d of the shaft member 36 and the tube 37a are arranged on opposite surfaces of the attachment portion 37b of the conversion member 37. The small diameter part 36c and the distal coupling portion 36d project from the conversion member 37. A C-shaped lock plate 39 is attached to the small diameter part 36c of the shaft member 36 in a direction orthogonal to the axial direction. The lock plate 39 is flange-shaped when attached to the shaft member 36. The lock plate 39 is in contact with the proximal end of an urging spring 41, which will be described later, and is used as a proximal supporting point. The lock plate 39 is also in contact with the attachment portion 37b of the conversion member 37 to restrict further movement of the shaft member 36 toward the proximal end. The second accommodation case 34 accommodates the portion of the shaft member 36 located at a distal side of the lock plate 39 including the distal coupling portion 36d.

The second accommodation case 34 accommodates a drive member 40, the urging spring 41, and a bearing 42. The drive member 40 includes a coupling tube 40a having a shape of a circular tube, a discoid flange 40b arranged at a distal side of the coupling tube 40a, and a drive shaft 40c having a shape of a circular rod projecting from the flange 40b toward the distal side. A coupling hole 40d extends inside the coupling tube 40a. The wall surface defining the coupling hole 40d is shaped in conformance with the shape of the outer peripheral surface of the distal coupling portion 36d of the shaft member 36 and includes ridges arranged in the circumferential direction at equal intervals. Each ridge extends in the axial direction and has, for example, a triangular cross section. The distal coupling portion 36d of the shaft member 36 is inserted into the coupling hole 40d and is movable in the axial direction. The distal coupling portion 36d locks in the coupling hole 40d in the rotational direction. More specifically, the coupling tube 40a of the drive member 40 has a coupling structure so that the distal coupling portion 36d of the shaft member 36, which is inserted into the coupling tube 40a, is movable in the axial direction and is rotatable integrally with the coupling tube 40a.

The urging spring 41 includes a compression coil spring and has a shape of a circular tube. The urging spring 41 has a distal end that is in contact with the flange 40b of the drive member 40 and a proximal end that is in contact with the lock plate 39. The coupling tube 40a of the drive member 40 is substantially inserted into a distal half of the urging spring 41. The urging spring 41 is located between the flange 40b and the lock plate 39 in a compressed state and urges the shaft member 36 from the flange 40b toward the proximal end via the lock plate 39. Since the drive member 40 and the shaft member 36 integrally rotate, the lock plate 39 and the flange 40b will not rotate relative to each other, so that the urging spring 41 located between the lock plate 39 and the flange 40b will not be twisted.

The drive shaft 40c of the drive member 40 includes the flange 40b, a rotational supporting part 40c1 located at a proximal side of the flange 40b, and a coupling part 40c2 located at a distal side of the flange 40b and partially cut to have a D-shaped cross section. The rotational supporting part 40c1 is rotationally supported by the bearing 42 attached at a point in the vicinity of the end wall of the second accommodation case 34. In this state, the flange 40b of the drive member 40 is in contact with the bearing 42 in the axial direction. A through hole 34b is formed in a central portion of the end wall of the second accommodation case 34. The coupling part 40c2 projects through the through hole 34b out of the second accommodation case 34 and serves as a coupling part to the wiper blade 32.

The wiper driver 31 configured as described above is fixed to the fixing portion 30 so that the axial direction of the wiper driver 31 extends in a depth-wise direction, that is, a direction orthogonal to the sensing surfaces 11a and 12a of the first and second ranging sensors 11 and 12. Since the ranging sensors 11 and 12 have a sufficient dimension in the depth-wise direction, the structure and layout of the wiper driver 31 conforming to the depth-wise direction is reasonable. The wiper driver 31 is configured so that a distal portion including the coupling part 40c2 projects from the sensing surfaces 11a and 12a.

The wiper blade 32 includes a wiper arm 45 and a blade rubber 46. One end of the wiper arm 45 is coupled to the coupling part 40c2 and fixed so as not to be separated in the axial direction. More specifically, the end of the wiper arm 45 includes a fitting hole 45a defined by a wall surface shaped in conformance with the shape of the outer peripheral surface of the coupling part 40c2 of the drive shaft 40c. When the coupling part 40c2 is coupled to the fitting hole 45a, the wiper arm 45 moves integrally with the drive shaft 40c. The blade rubber 46 is attached to the wiper arm 45. The blade rubber 46 is arranged to be contactable with the respective sensing surfaces 11a and 12a of the ranging sensors 11 and 12.

The rest position of the wiper blade 32 is set to the position shown in FIG. 2, that is, a position at which the distal portion of the wiper blade 32 is located at a slightly lower position than the proximal portion of the wiper blade 32 in the horizontal direction as the sensing surfaces 11a and 12a are viewed. When driven by the wiper driver 31, the wiper blade 32 performs a reciprocal wiping operation in a range through an intermediate position shown in FIG. 3 to an inverse position shown in FIG. 4, in this case, the axisymmetric position in relation to the rest position, to remove extraneous objects from the sensing surfaces 11a and 12a to clean the sensing surfaces 11a and 12a. Thus, the cleaning devices 21 and 22 including the wiper devices W1 and W2 are configured.

As shown in FIG. 1, various electronic control units (ECUs) mounted on the vehicle 10 control the switch valves 23 and 24 that switch the supply destination of the cleaning liquid Ws to one of the washer pump 14 in the washer device 13, which pressure-feeds the cleaning liquid Ws, and the wiper devices W1 and W2 and the ejection nozzles N1 and N2 in the first and second cleaning devices 21 and 22. More specifically, the washer pump 14 and the switch valves 23 and 24 are controlled by a higher order ECU 50, a front ECU 51, and a rear ECU 52. The front ECU 51 is used to control the washer pump 14 and the switch valve 23 of the first cleaning device 21. The rear ECU 52 is used to control the switch valve 24 of the second cleaning device 22. The higher order ECU 50 centrally controls the front ECU 51 and the rear ECU 52.

The operation and effects of the present embodiment will be described.

In the higher order ECU 50, cleaning instructions to the first and second cleaning devices 21 and 22 are generated based on collection of extraneous objects such as raindrops or dirt on the sensing surfaces 11a and 12a of the first and second ranging sensors 11 and 12 or at a predetermined interval regardless of whether extraneous objects are present. When the cleaning instructions are generated, the higher order ECU 50 controls the driving of the washer pump 14 and the driving of the switch valves 23 and 24 through the front and rear ECUs 51 and 52 so that the washer pump 14 coordinates with the switch valves 23 and 24.

For example, when driving the wiper devices W1 and W2 of the cleaning devices 21 and 22, the switch valves 23 and 24 are switched so that the washer pump 14 communicates with the wiper drivers 31 of the wiper devices W1 and W2 in coordination with the driving of the washer pump 14.

Figure 5A:
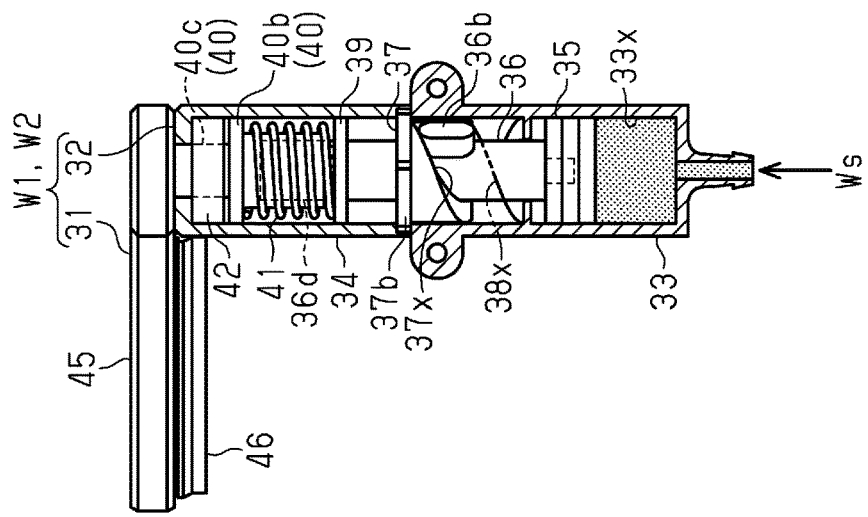
FIGS. 5A, 5B, and 5C are plan views showing configurations and operation of the vehicle cleaning device shown in FIG. 2.

As a result, when the wiper blade 32 is in the rest state as shown in FIGS. 2 and 5A, the cleaning liquid Ws flows into the inflow chamber 33x of the wiper driver 31, and the shaft member 36 together with the piston 35 moves forward toward the distal end in the axial direction. At this time, the guide projections 36b of the shaft member 36 slide on the inclined portions 37x, and the shaft member 36 moves forward while rotating clockwise as viewed from the proximal side toward the distal side. The distal coupling portion 36d of the shaft member 36 has a coupling structure so that allows axial movement of the distal coupling portion 36d relative to the coupling tube 40a of the drive member 40 and locks the distal coupling portion 36d in the rotational direction. Thus, only rotational force is transmitted from the shaft member 36 to the drive member 40. As a result, the wiper blade 32, which is actuated integrally with the drive member 40, starts a wiping operation.

Figure 3:
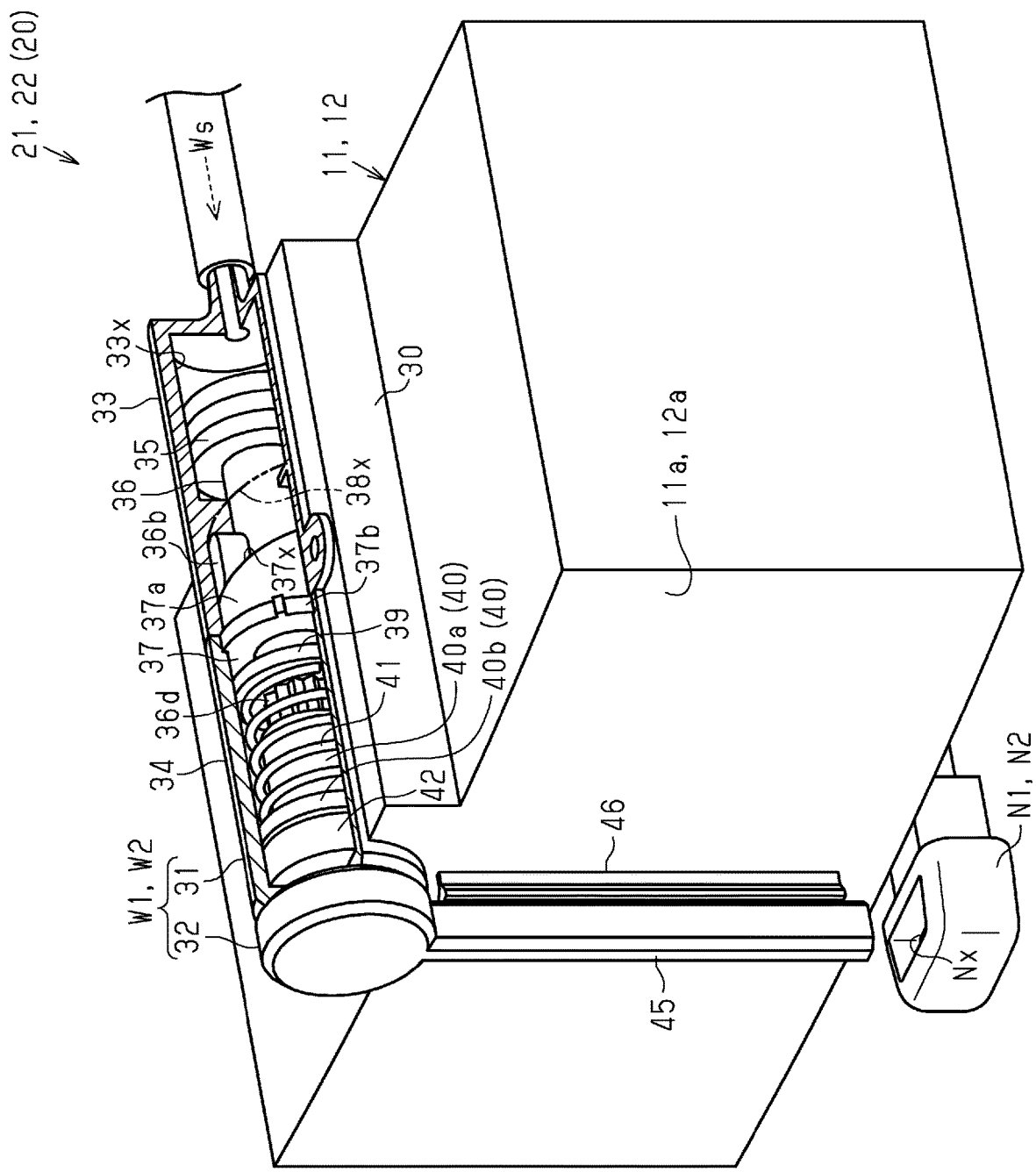
FIG. 3 is a perspective view showing configurations and operation of the vehicle cleaning device shown in FIG. 2.
Figure 4:
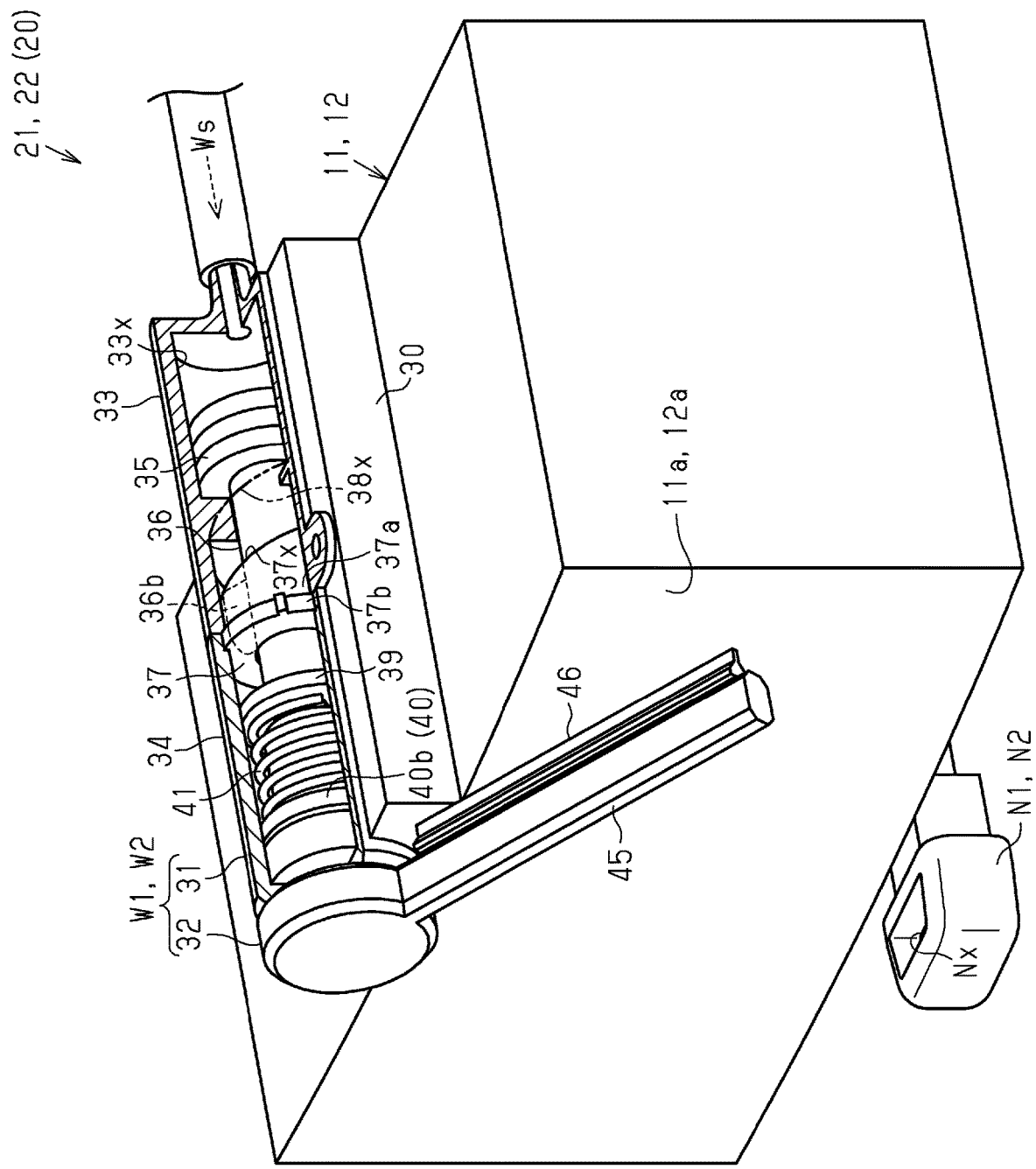
FIG. 4 is a perspective view showing configurations and operation of the vehicle cleaning device shown in FIG. 2.
Figure 5B:
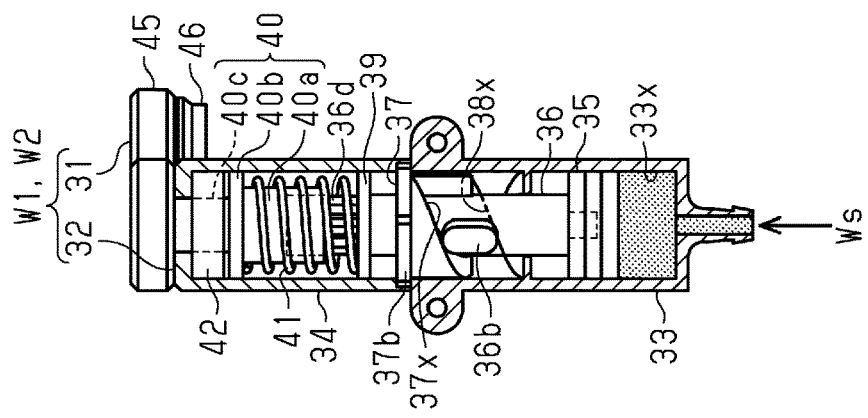
Figure 5C:
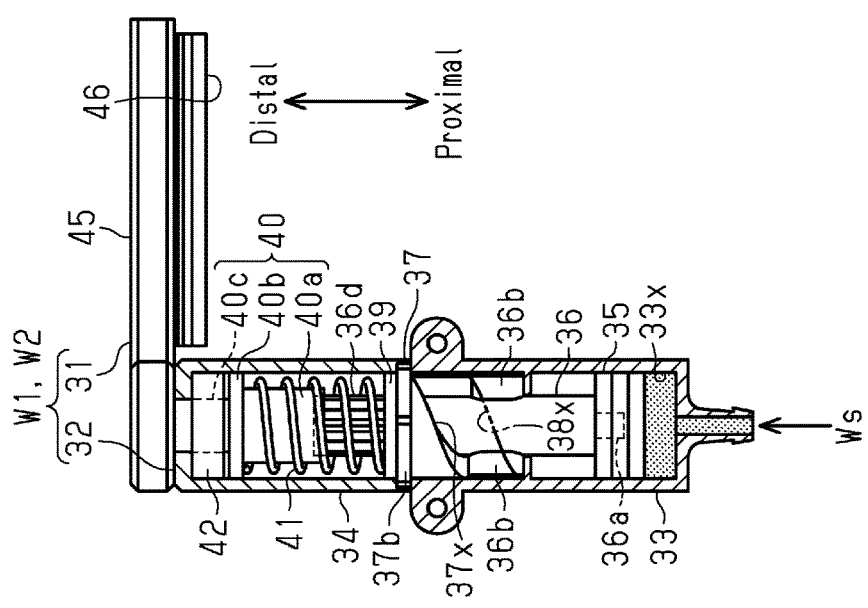

The reciprocal wiping operation of the wiper blade 32 is performed from the rest position shown in FIGS. 2 and 5A through the intermediate position at which the distal portion of the wiper blade 32 faces downward as shown in FIGS. 3 and 5B, to the inverse position at which the distal portion of the wiper blade 32 faces rightward as shown in FIGS. 4 and 5C. During a forward wiping operation of the wiper blade 32 from the rest position to the inverse position, the driving of the washer pump 14 continues, and the supply of the cleaning liquid Ws to the wiper driver 31 continues. Accordingly, the shaft member 36 continues to move forward while rotating, and the urging spring 41 gradually compresses and deforms to accumulate urging force.

The driving of the washer pump 14 stops at a predetermined point in time considering a reverse wiping operation (i.e., inverse operation) from when the wiper blade 32 reaches the inverse position. Consequently, the urging spring 41 moves the shaft member 36 rearward using the accumulated urging force (resilient force of the compressed and deformed urging spring 41). At this time, the guide projections 36b of the shaft member 36 slide on the inclined portions 38x, and the shaft member 36 moves rearward while rotating counterclockwise. Thus, the wiper blade 32 performs the inverse operation from the inverse position toward the rest position. The accumulated urging force of the urging spring 41 gradually decreases.

To smoothly move the shaft member 36 rearward, the cleaning liquid Ws needs to be smoothly discharged from the inflow chamber 33x by the corresponding movement of the piston 35. The cleaning liquid Ws may return to the tank 15 when the washer pump 14 is stopped or may be configured to discharge to a discharge portion arranged in a predetermined location of the passage of the cleaning liquid Ws. When the discharge portion is set in the switch valves 23 and 24 or between the wiper driver 31 and the switch valves 23 and 24, the passage to the wiper driver 31 may be blocked by the switch valves 23 and 24.

As described above, when the reciprocal wiping operation of the wiper blade 32 is performed once or more, the wiper blade 32 directly scrapes the extraneous objects such as raindrops or dirt collected on the sensing surfaces 11a and 12a of the ranging sensors 11 and 12. Thus, the extraneous objects are more reliably removed. In addition, before or during the wiping operation of the wiper blade 32, the cleaning liquid Ws may be ejected and supplied from the ejection nozzles N1 and N2 to the sensing surfaces 11a and 12a to assist in the removal and cleaning of the extraneous objects. In this case, it is preferred that after the cleaning liquid Ws is supplied to the sensing surfaces 11a and 12a, the wiper blade 32 wipes the cleaning liquid Ws so that the cleaning liquid Ws will not remain.

The advantages of the present embodiment will now be described.

(1) The cleaning devices 21 and 22 include the wiper devices W1 and W2. Each of the wiper devices W1 and W2 include the wiper driver 31 that are actuated based on the supply of the cleaning liquid Ws pressure-fed from the washer device 13 mounted on the vehicle 10. The wiper driver 31 includes the piston 35 and the shaft member 36, which correspond to a linear movement portion that produces an axial linear movement based on the supply of the cleaning liquid Ws. The wiper driver 31 further includes the conversion member 37 and the drive member 40, which correspond to a movement converter that converts the linear movement to a pivoting movement. The wiper driver 31 causes the wiper blade 32 to perform the reciprocal wiping operation based on the converted pivoting movement. More specifically, the wiper blade 32 performing the wiping operation directly scrapes and removes the extraneous objects from the sensing surfaces 11a and 12a of the ranging sensors 11 and 12, which are the cleaning subjects of the vehicle 10. Thus, the sensing surfaces 11a and 12a are more reliably cleaned.

(2) The piston 35 and the shaft member 36, which form the linear movement portion, and the conversion member 37 and the drive member 40, which form the movement converter, are arranged beside each other on the axis of the wiper driver 31, that is, at the pivot point of the wiper blade 32. In other words, the wiper driver 31 of the present embodiment has a shape of a rod that is compact in the width-wide direction. Since the ranging sensors 11 and 12 used in the present embodiment have a sufficient depth, the wiper driver 31 of the present embodiment has a reasonable structure and a reasonable layout. In addition, the pivot point of the wiper blade 32 is readily arranged in the vicinity of the sensing surfaces 11a and 12a, which are surfaces that are cleaned, so that the pivoting movement is performed. Thus, the wiper blade 32 readily wipes the sensing surfaces 11a and 12a.

(3) In the reciprocal linear movement of the shaft member 36 of the wiper driver 31, forward movement of the shaft member 36 is performed based on the supply of the cleaning liquid Ws to accumulate urging force in the urging spring 41. Rearward movement of the shaft member 36 is performed by receiving the urging force accumulated in the urging spring 41 based on a stopping of the supply of the cleaning liquid Ws. In other words, the cleaning liquid Ws produces a linear movement to one side, and the urging spring 41 produces a linear movement to the other side. This may simplify the configuration of the wiper driver 31 and, for example, simplify the passage of the cleaning liquid Ws.

(4) The use of the ejection nozzles N1 and N2, which eject and supply the cleaning liquid Ws to the sensing surfaces 11a and 12a, may further reliably remove the extraneous objects from the sensing surfaces 11a and 12a to clean the sensing surfaces 11a and 12a.

The first embodiment may be modified as follows. The present embodiment and the following modified examples can be combined as long as the combined modified examples remain technically consistent with each other.

An example of the configuration of the wiper driver 31 is described. The configuration of the wiper driver 31 may be appropriately changed.

In the first embodiment, the piston 35, the shaft member 36, the conversion member 37, and the drive member 40 are coaxially arranged to obtain the rod-shaped wiper driver 31. The layout configuration may be changed to obtain a configuration shortened in the axial direction.

In the first embodiment, the cleaning liquid Ws produces the linear movement to one side, and the urging spring 41 produces the linear movement to the other side. Instead, both of the linear movements may be produced by the cleaning liquid Ws, and the urging spring 41 may be omitted.

The arrangement positions of the wiper devices W1 and W2 with respect to the sensing surfaces 11a and 12a may be appropriately changed.

Preferably, the arrangement positions of the ejection nozzles N1 and N2 with respect to the sensing surfaces 11a and 12a are at a lower side of the sensing surfaces 11a and 12a in the gravitational direction so that after ejection, the liquid oozed from the ejection nozzles N1 and N2 will not reach the sensing surfaces 11a and 12a. However, the arrangement positions may be appropriately changed. The ejection nozzles N1 and N2 may be omitted. In this case, the switch valves 23 and 24 may also be omitted.

The ranging sensors 11 and 12 are respectively arranged on the front end central portion of the vehicle 10 and the rear end central portion of the vehicle 10. However, the arrangement is not is not limited to this configuration, and the ranging sensors 11 and 12 may be arranged on the right surface and the left surface of the vehicle 10.

The sensing surfaces 11a and 12a of the ranging sensors 11 and 12 are cleaning subjects. However, there is no limitation to this configuration. The cleaning subject may be, for example, a camera that captures an image of the surroundings of the vehicle 10, a sensor other than the optical sensors, and a headlight 16, a taillamp 17, and a mirror 18 that are different from sensors and shown in FIG. 1.

Second Embodiment

A second embodiment of a vehicle cleaning device, a vehicle cleaning system, and a method for controlling a vehicle cleaning system will be described below.

Figure 7:
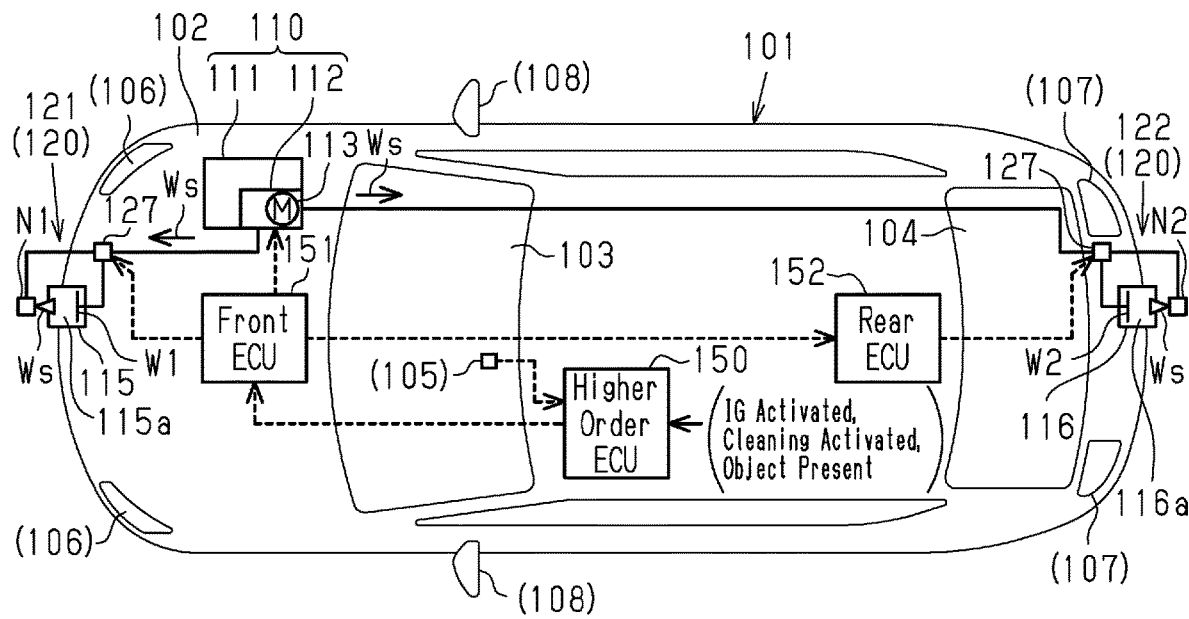
FIG. 7 is a configuration diagram of a vehicle on which a second embodiment of a vehicle cleaning device is mounted.

As shown in FIG. 7, a washer tank 111 and a pump device 112 are arranged beside each other, for example, in a front accommodation space 102 of a vehicle 101. The pump device 112 includes an electric pump motor 113 as a drive source. When the pump motor 113 is driven to rotate, the pump device 112 pressure-feeds the cleaning liquid Ws stored in the washer tank 111 to each location of the vehicle 101. The washer tank 111 and the pump device 112 correspond to a typical cleaning liquid supply device 110 mounted on a vehicle to supply the cleaning liquid Ws from a supply nozzle, which is not shown in the drawings, toward the external surfaces of a front windshield 103 and a rear windshield 104 of the vehicle 101. This also applies to a vehicle cleaning device 120a of the present embodiment, which will be described later.

The vehicle 101 has a front end central portion provided with a first optical sensor 115 and a rear end central portion provided with a second optical sensor 116. The first and second optical sensors 115 and 116 are onboard optical sensors used in a ranging system (LIDAR) that transmits and receives light having a predetermined wavelength toward the front or the rear of the vehicle 101 to measure the distance from a subject located frontward or rearward of the vehicle 101. The ranging system is used in a system that performs advanced driving assistance or autonomous driving of the vehicle 101.

Since the first and second optical sensors 115 and 116 are configured to have sensing surfaces 115a and 116a (e.g., external surface such as lens or cover glass) exposed to the outside of the vehicle 101, extraneous objects such as raindrops or dirt may collect on the sensing surfaces 115a and 116a. Collection of extraneous objects on the sensing surfaces 115a and 116a of the optical sensors 115 and 116 may lower the ranging accuracy and may affect a system that performs advanced driving assistance or autonomous driving. In this regard, the first and second optical sensors 115 and 116 include a first cleaning device 121a and a second cleaning device 122a as a vehicle cleaning device 120a configured to remove extraneous objects from the sensing surfaces 115a and 116a to clean the sensing surfaces 115a and 116a.

The first cleaning device 121a includes an ejection nozzle N1 that ejects and supplies the cleaning liquid Ws to the sensing surface 115a of the first optical sensor 115 located at a front side of the vehicle 101 and a wiper device W1 that is in contact with the sensing surface 115a and substantially wipes the entirety of the sensing surface 115a. Also, the second cleaning device 122a includes an ejection nozzle N2 that ejects and supplies the cleaning liquid Ws to the sensing surface 116a of the second optical sensor 116 located at a rear side of the vehicle 101 and a wiper device W2 that is in contact with the sensing surface 116a and substantially wipes the entirety of the sensing surface 116a. In the first and second optical sensors 115 and 116 of the present embodiment, the sensing surfaces 115a and 116a are rectangular and arranged so that a pair of opposing sides extends in the horizontal direction (direction orthogonal to the vertical direction of the vehicle 101).

Figure 8:
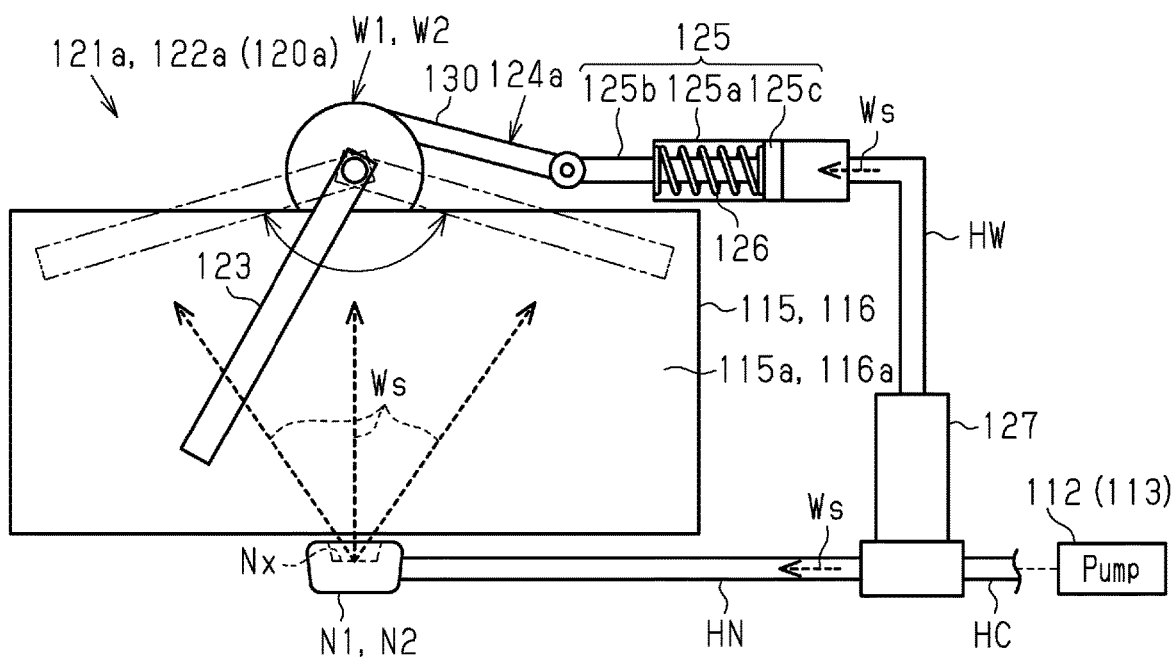
FIG. 8 is a configuration diagram of the vehicle cleaning device shown in FIG. 7.

As shown in FIG. 8, the ejection nozzles N1 and N2 of the first and second cleaning devices 121a and 122a are arranged at a lower side of the optical sensors 115 and 116 in the vertical direction of the vehicle 101 so that the ejection port Nx faces upward (upper side of the vehicle 101) and the cleaning liquid Ws is configured to be ejected and supplied from the ejection port Nx to the sensing surfaces 115a and 116a. More specifically, the ejection nozzles N1 and N2 are arranged so that at least the ejection ports Nx project to the exterior of the vehicle 101 from the optical sensors 115 and 116 (sensing surfaces 115a and 116a). The cleaning liquid Ws ejected and supplied from the ejection port Nx is configured to spread over the entirety of the sensing surfaces 115a and 116a at least in the horizontal direction, that is, spread over the entirety of a wiper blade 123 in the longitudinal direction. Each of the ejection nozzles N1 and N2 is connected to a switch valve 127, which corresponds to a switching portion described later, by the nozzle side hose HN so that the cleaning liquid Ws flows through.

The wiper devices W1 and W2 of the first and second cleaning devices 121a and 122a are arranged at an upper side of the optical sensors 115 and 116 (upper side of the ejection nozzles N1 and N2) in the vertical direction of the vehicle 101. The wiper blade 123 is arranged on the upper edge of the sensing surfaces 115a and 116a so that the reciprocal pivoting movement of the wiper blade 123 is performed on the sensing surfaces 115a and 116a. Each of the wiper devices W1 and W2 includes the wiper blade 123 and a wiper driver 124a. The wiper driver 124a includes a drive cylinder 125, an urging spring 126, and a movement converter 130. The wiper devices W1 and W2 have the same configuration. The same reference numerals are given to the wiper blade 123 and the wiper driver 124a (drive cylinder 125, urging spring 126, and movement converter 130). The wiper driver 124a is connected to the switch valve 127, which will be described later, by the wiper side hose HW so that the cleaning liquid Ws flows through. More specifically, the drive cylinder 125 of the wiper driver 124a includes a cylinder portion 125a that is connected to the switch valve 127 by the wiper side hose HW so that the cleaning liquid Ws flows through.

The wiper driver 124a of the second embodiment is configured to convert a reciprocal linear movement of an output rod 125b of the drive cylinder 125 into a reciprocal pivoting movement of the wiper blade 123 via the movement converter 130. The pivoting fulcrum of the wiper blade 123 is set on a central portion of the upper edge of the sensing surfaces 115a and 116a located at a side opposite to the ejection nozzles N1 and N2. The orientation of the wiper blade 123 when located at the rest position is set so that the longitudinal direction of the wiper blade 123 extends substantially in the horizontal direction. The wiper blade 123 reciprocally pivots to perform a wiping operation on the sensing surfaces 115a and 116a at a predetermined angle.

The drive cylinder 125 includes the tubular cylinder portion 125a and the output rod 125b (piston rod) having one end including a supply pressure receiver 125c and the other end coupled to the wiper blade 123. The supply pressure receiver 125c and the output rod 125b (piston rod) are used as a linear movement portion. The urging spring 126 is arranged in the cylinder portion 125a so that the urging spring 126 is held between an end surface of the supply pressure receiver 125c and an inner surface of the cylinder portion 125a that is opposed to the end surface of the supply pressure receiver 125c. When the wiper blade 123 is located at the initial position, the output rod 125b is accommodated in the cylinder portion 125a.

The wiper driver 124a is configured to receive the supply pressure of the cleaning liquid Ws with a further end surface of the supply pressure receiver 125c of the output rod 125b. When receiving the supply pressure of the cleaning liquid Ws, the output rod 125b projects from the cylinder portion 125a against the urging force of the urging spring 126. As a result, the wiper blade 123 pivots on the sensing surfaces 115a and 116a from one side to a further side in the range of the predetermined angle. That is, the wiper blade 123 pivots in a forward direction. When the supply pressure of the cleaning liquid Ws is exhausted, the cleaning liquid Ws is discharged out of the drive cylinder 125 from a discharge port, which is not shown in the drawings. The output rod 125b is retracted in the cylinder portion 125a by the urging force of the urging spring 126. As a result, the wiper blade 123 pivots on the sensing surfaces 115a and 116a from the further side to the one side in the range of the predetermined angle. That is, the wiper blade 123 pivots in a rearward direction.

A resin member, which is not shown in the drawings, is arranged on an outer peripheral surface of the supply pressure receiver 125c. The resin member slides on an inner peripheral surface of the cylinder portion 125a. The resin member limits leakage of the cleaning liquid Ws to the space of the cylinder portion 125a accommodating the urging spring 126.

A compression coil spring is used as the urging spring 126. However, there is no limitation to this configuration. For example, a tension coil spring may be used as the urging spring. In this case, the tension coil spring is located between the further end surface of the supply pressure receiver 125c and the inner surface of the cylinder portion 125a, which is opposed to the further end surface of the supply pressure receiver 125c, and hooked on the further end surface of the supply pressure receiver 125c and the inner surface of the cylinder portion 125a.

In the first cleaning device 121a, the cleaning liquid Ws that is pressure-fed from the pump device 112 is divided at the switch valve 127 and supplied to the wiper driver 12a4 of the wiper device W1 and the ejection nozzle N1. In the same manner, in the second cleaning device 122a, the cleaning liquid Ws that is pressure-fed from the pump device 112 is divided at the switch valve 127 and supplied to the wiper driver 124a of the wiper device W2 and the ejection nozzle N2. The switch valve 127 of each of the cleaning devices 121a and 122a is, for example, an electromagnetic valve including a solenoid. The switch valves 127 of the cleaning devices 121a and 122a are controlled and switched by respective front and rear ECUs 151 and 152, which will be described later. Each switch valve 127 selects the passage to the wiper driver 124a of the corresponding one of the wiper devices W1 and W2 or the passage to the corresponding one of the ejection nozzles N1 and N2 to supply the cleaning liquid Ws. The switch valve 127 is connected to the pump device 112 and a shared hose HC so that the cleaning liquid Ws flows through.

The pump device 112 (pump motor 113) and the switch valves 127 of the first and second cleaning devices 121a and 122a are controlled by various electronic control units (ECUs) mounted on the vehicle 101, namely, a higher order ECU 150, the front ECU 151, and the rear ECU 152. The higher order ECU 150, the front ECU 151, and the rear ECU 152 are used as controllers. The front ECU 151 is located at a front side of the vehicle 101 and used to control the pump motor 113 and the switch valve 127 of the first cleaning device 121a. The rear ECU 152 is located at a rear side of the vehicle 101 and used to control the switch valve 127 of the second cleaning device 122a. The higher order ECU 150 centrally controls the front ECU 151 and the rear ECU 152. The higher order ECU 150, the front ECU 151, and the rear ECU 152 are mounted on predetermined positions of the vehicle 101. The vehicle cleaning system of the present embodiment includes the vehicle cleaning device 120a (first and second cleaning devices 121a and 122a) and the ECUs 150 to 152 configured as described above.

The control mode and effects of the vehicle cleaning system of the second embodiment will be described.

Figure 9:
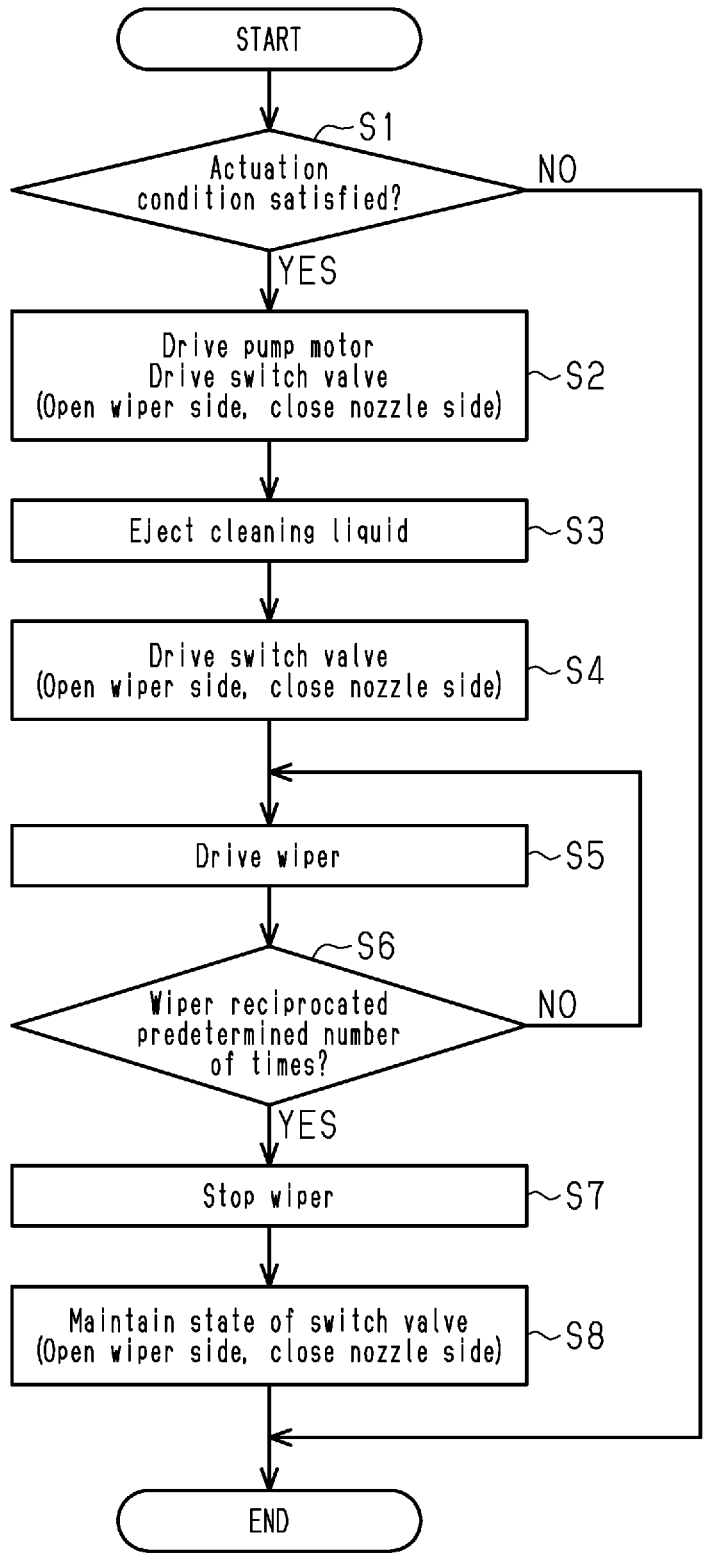
FIG. 9 is a flowchart showing a control mode of the vehicle cleaning device shown in FIG. 8.

FIG. 9 shows a control flow of the second embodiment executed based on a central process of the higher order ECU 150 cooperating with the front ECU 151 and the rear ECU 152.

In step S1, it is determined whether an actuation condition of the vehicle cleaning device 120a is satisfied. When the predetermined actuation condition is satisfied, the controller (150, 151, 152) proceeds to the next step S2. An example of the actuation condition includes an ignition switch of the vehicle 101 being activated (in FIG. 7, IG activated), an actuation switch of the vehicle cleaning device 120a being activated (in FIG. 7, cleaning activated), and presence of an extraneous object collected on the sensing surfaces 115a and 116a of the optical sensors 115 and 116 being detected by an object detection sensor (in FIG. 7, object present). The actuation condition may be appropriately changed. When an automatic cleaning is regularly performed, the object detection is not necessary.

In step S2, the pump motor 113 is driven to start to pressure-feed the cleaning liquid Ws. In addition, the switch valves 127 switch the passage through which the cleaning liquid Ws is pressure-fed to open the portion extending toward the ejection nozzles N1 and N2 and close the portion extending toward the wiper devices W1 and W2 (wiper drivers 124a). If the passage is already in this mode, the mode is maintained. After step S2, the controller (150, 151, 152) proceeds to step S3.

In step S3, the cleaning liquid Ws is ejected and supplied from one or both of the ejection nozzles N1 and N2 of the optical sensors 115 and 116 on which it is determined that cleaning needs to be performed. As a result, the extraneous objects are separated and removed from the sensing surfaces 115a and 116a by, for example, ejection pressure of the cleaning liquid Ws and cleaning components of the cleaning liquid Ws. After step S3, the controller (150, 151, 152) proceeds to step S4.

In step S4, the switch valves 127 switch the passage through which the cleaning liquid Ws is pressure-fed to open the portion extending toward the wiper devices W1 and W2 and close the portion extending toward the ejection nozzles N1 and N2. That is, while the ejection and supply of the cleaning liquid Ws from the ejection nozzles N1 and N2 is stopped, the supply pressure of the cleaning liquid Ws is applied to the wiper driver 124a. After step S4, the controller (150, 151, 152) proceeds to step S5.

In step S5, the wiper driver 124a receives the supply pressure of the cleaning liquid Ws so that the wiper blade 123 performs a wiping operation. Since the wiping of the wiper blade 123 slides on the sensing surfaces 115a and 116a, the direct wiping of the wiper blade 123 reliably removes the cleaning liquid Ws and extraneous objects that are firmly collected on the sensing surfaces 115a and 116a and remain when the cleaning liquid Ws is supplied and ejected. In a single reciprocation of the wiping operation of the wiper blade 123, the wiper blade 123 is moved forward (driven from the one side to the further side in the predetermined angle range) during an application period of the supply pressure of the cleaning liquid Ws to the wiper driver 124a, and is moved rearward (driven from the further side to the one side in the predetermined angle range) by the urging force of the urging spring 126 during a non-application period of the supply pressure of the cleaning liquid Ws. After step S5, the controller (150, 151, 152) proceeds to step S6.

In step S6, steps S5 and S6 are repeated until the reciprocal wiping operation of the wiper blade 123 is performed a predetermined number of times. When the driving and stopping of the pump motor 113 are repeatedly performed a number of times, the wiper blade 123 performs the wiping operation a number of times. The switch valve 127 may perform the switching between the wiper driver 124a and the ejection nozzles N1 and N2 a number of times. In this case, the wiping operation of the wiper blade 123 and the ejection of the cleaning liquid Ws are alternately performed a number of times. When the reciprocal wiping operation of the wiper blade 123 has been performed the predetermined number of times, the controller (150, 151, 152) proceeds to the next step S7.

In step S7, after the reciprocal wiping operation of the wiper blade 123 is performed the predetermined number of times, the driving of the pump motor 113 is stopped so that the wiper blade 123 returns to the initial position and stops the wiping operation. After step S7, the controller (150, 151, 152) proceeds to step S8.

In step S8, the portion of the passage in the switch valve 127 extending toward the wiper devices W1 and W2 is maintained in the open state, and the portion of the passage in the switch valve 127 extending toward the ejection nozzles N1 and N2 is maintained in the closed state. This limits leakage of the cleaning liquid Ws from the ejection nozzles N1 and N2. Step S8 may be omitted. Steps S1 to S8 described above are a sequence of the cleaning operation.

As described above, in the vehicle cleaning device 120a of the second embodiment, in addition to the ejecting of the cleaning liquid Ws, the wiping with the wiper blade 123 is performed to remove extraneous objects from the sensing surfaces 115a and 116a. Thus, extraneous objects such as those firmly collected on the sensing surfaces 115a and 116a are more reliably removed and the sensing surfaces 115a and 116a are more reliably cleaned. In addition, the wiping operation of the wiper blade 123 is performed when the switch valve 127 switches the passage so that the supply pressure of the cleaning liquid Ws pressure-fed to the ejection nozzles N1 and N2 is applied to the wiper driver 124a. This dispenses with an electric motor for driving the wiper and simplifies the structure of the vehicle cleaning device 120a.

The advantage of the second embodiment will now be described.

(2-1) The vehicle cleaning device 120a of the second embodiment includes the ejection nozzles N1 and N2 and the wiper devices W1 and W2. The ejection nozzles N1 and N2 eject and supply the cleaning liquid Ws, which is pressure-fed from the cleaning liquid supply device 110, to the sensing surfaces 115a and 116a of the optical sensors 115 and 116, that is, cleaning subjects of the vehicle 101. The wiper devices W1 and W2 receive the supply pressure of the cleaning liquid Ws so that the wiper driver 124a is driven to cause the wiper blade 123 to perform a wiping operation. The switch valve 127 switches the supply destination of the cleaning liquid Ws to the wiper driver 124a or to the ejection nozzles N1 and N2, so that the ejection and supply of the cleaning liquid Ws and the wiping operation of the wiper blade 123 are appropriately selected. More reliable removing and cleaning, which include the wiping operation of the wiper blade 123, are performed on extraneous objects collected on the cleaning subject of the vehicle 101. The wiper driver 124a, which causes the wiper blade 123 to perform the wiping operation, is configured to obtain drive force from the supply pressure of the cleaning liquid Ws. This allows the vehicle cleaning device to have a simple structure that does not use an electric motor for driving the wiper.

(2-2) The wiper driver 124a uses the drive cylinder 125, which corresponds to a linear movement device that receives the supply pressure of the cleaning liquid Ws and performs a linear movement, and the movement converter 130, which converts the linear movement of the drive cylinder 125 to a pivoting movement. The wiper devices W1 and W2 are configured to cause the wiper blade 123 to perform the pivoting wiping operation based on the pivoting movement of the movement converter 130. More specifically, the wiper devices W1 and W2 are configured by simple mechanisms such as conversion of the linear movement of the drive cylinder 125 to the pivoting movement via the movement converter 130.

(2-3) The wiper devices W1 and W2 cause the wiper blade 123 to perform the pivoting wiping operation about the pivoting fulcrum set on the central portion of the upper edge of the sensing surfaces 115a and 116a. With this configuration, removal of raindrops and droplets of the cleaning liquid Ws from the sensing surfaces 115a and 116a is readily and reliably performed from the distal side of the wiper blade 123.

(2-4) The wiper driver 124a is configured so that the supply pressure of the cleaning liquid Ws is received to project the output rod 125b of the drive cylinder 125 and that the output rod 125b is returned by urging force of the urging spring 126 based on the stopping of the supply of the cleaning liquid Ws. Thus, the wiper devices W1 and W2 are configured by a simple mechanism that drives only the projection side (forward movement of wiper blade) using the supply pressure of the cleaning liquid Ws and operates the return side (rearward movement of wiper blade) using the urging spring 126.

(2-5) The ejection nozzles N1 and N2 are arranged at a vertically lower side of the wiper blades 123 (lower side in the vertical direction of the vehicle 101), so that the cleaning liquid Ws ejected and supplied from the ejection nozzles N1 and N2 are appropriately wiped by the wiper blades 123. In addition, the ejection nozzles N1 and N2 are arranged at a lower side of the sensing surfaces 115a and 116a. This reduces residues of unnecessary cleaning liquid Ws leaked from the ejection nozzles N1 and N2 and collected on the sensing surfaces 115a and 116a.

(2-6) The ECU 150 (ECUs 151 and 152) controls the pump motor 113 and the switch valves 127 so that the cleaning liquid Ws is ejected and supplied from the ejection nozzles N1 and N2 to the sensing surfaces 115a and 116a and then the wiper blades 123 reciprocally wipe the sensing surfaces 115a and 116a. More specifically, removal of extraneous objects from the sensing surfaces 115a and 116a is attempted by ejecting and supplying the cleaning liquid Ws, which produces cleaning effects. Subsequently, the wiper blade 123 performs the wiping operation using the cleaning liquid Ws present on the sensing surfaces 115a and 116a. Thus, the sensing surfaces 115a and 116a are appropriately cleaned.

Third Embodiment

A third embodiment of a vehicle cleaning system (vehicle cleaning device) will be described below.

Figure 10:
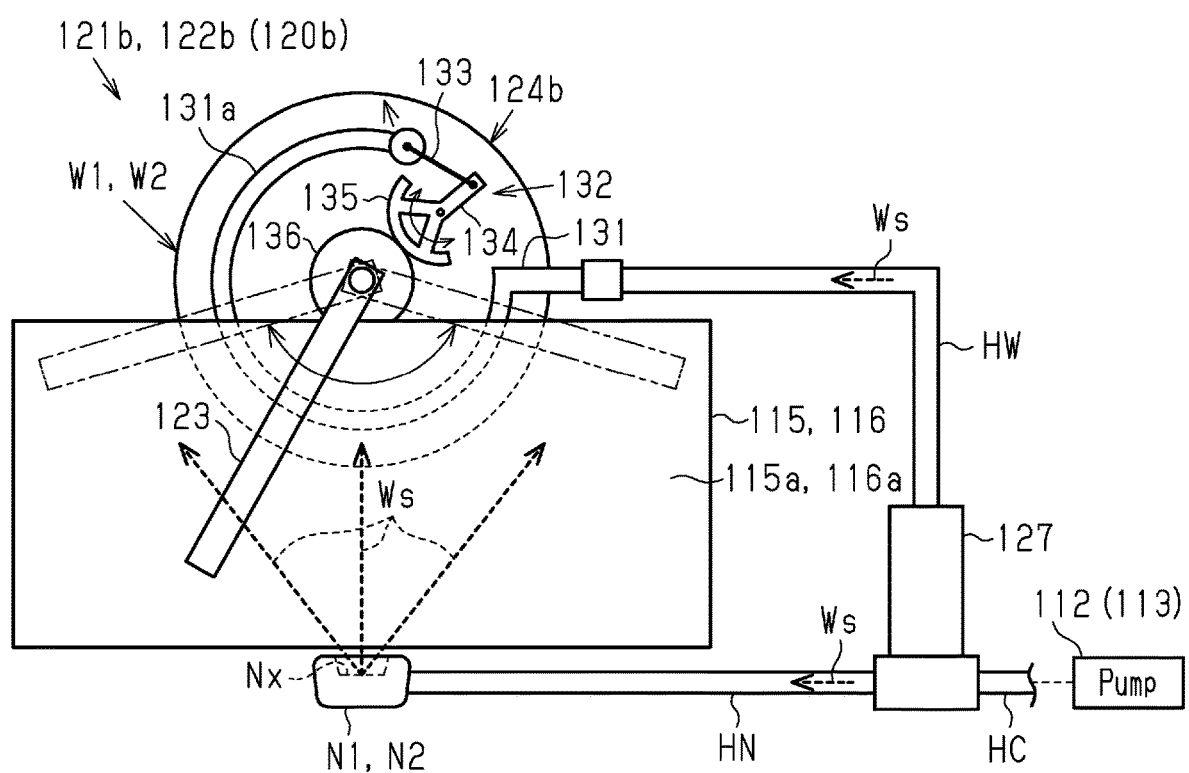
FIG. 10 is a configuration diagram of a third embodiment of a vehicle cleaning device.

FIG. 10 shows the third embodiment of a vehicle cleaning device 120b including first and second vehicle cleaning devices 121b and 122b. The first and second vehicle cleaning devices 121b and 122b perform wiping operations by reciprocally pivoting the wiper blade 123 in the same manner as the second embodiment without using the drive cylinder 125 of the second embodiment, replacing it with a Bourdon tube type of a wiper driver 124b.

More specifically, in the wiper driver 124b of the third embodiment, the switch valve 127 is connected to one end of a Bourdon tube 131 by the wiper side hose HW, and the other end of the Bourdon tube 131 is connected to one end of a pivoting member 134 by a connecting rod 133 forming a movement converter 132. More specifically, when the supply pressure of the cleaning liquid Ws is applied to the Bourdon tube 131 through the switch valve 127, an annular portion 131a of the Bourdon tube 131 located at the other end deforms to bulge outward. The deformation results in a pivoting movement of the pivoting member 134 via the connecting rod 133. The other end of the pivoting member 134 includes a sector gear 135 that engages with a spur gear 136 fixed to a support shaft of an end of the wiper blade 123. Thus, the pivoting movement of the pivoting member 134 is changed to a pivoting movement of the wiper blade 123. As described above, the Bourdon tube type wiper driver 124b may be used to perform a reciprocal pivoting movement of the wiper blade 123. The configuration excluding the wiper driver 124b is the same as that of the second embodiment.

The advantage of the third embodiment will now be described. The third embodiment obtains advantages similar to the advantages (2-1), (2-3), (2-5), and (2-6) of the second embodiment.

(3-1) The wiper driver 124b uses the Bourdon tube 131 that is deformed and actuated when receiving the supply pressure of the cleaning liquid Ws and the movement converter 132 that converts the deforming movement of the Bourdon tube 131 into a pivoting movement. The wiper devices W1 and W2 are configured to cause the wiper blade 123 to perform the pivoting wiping operation based on the pivoting movement of the movement converter 132. More specifically, the wiper devices W1 and W2 are configured by simple mechanisms such as conversion of the deforming movement of the Bourdon tube 131 into the pivoting movement via the movement converter 132.

Fourth Embodiment

A fourth embodiment of a method for controlling a vehicle cleaning system will be described below.

Figure 11:
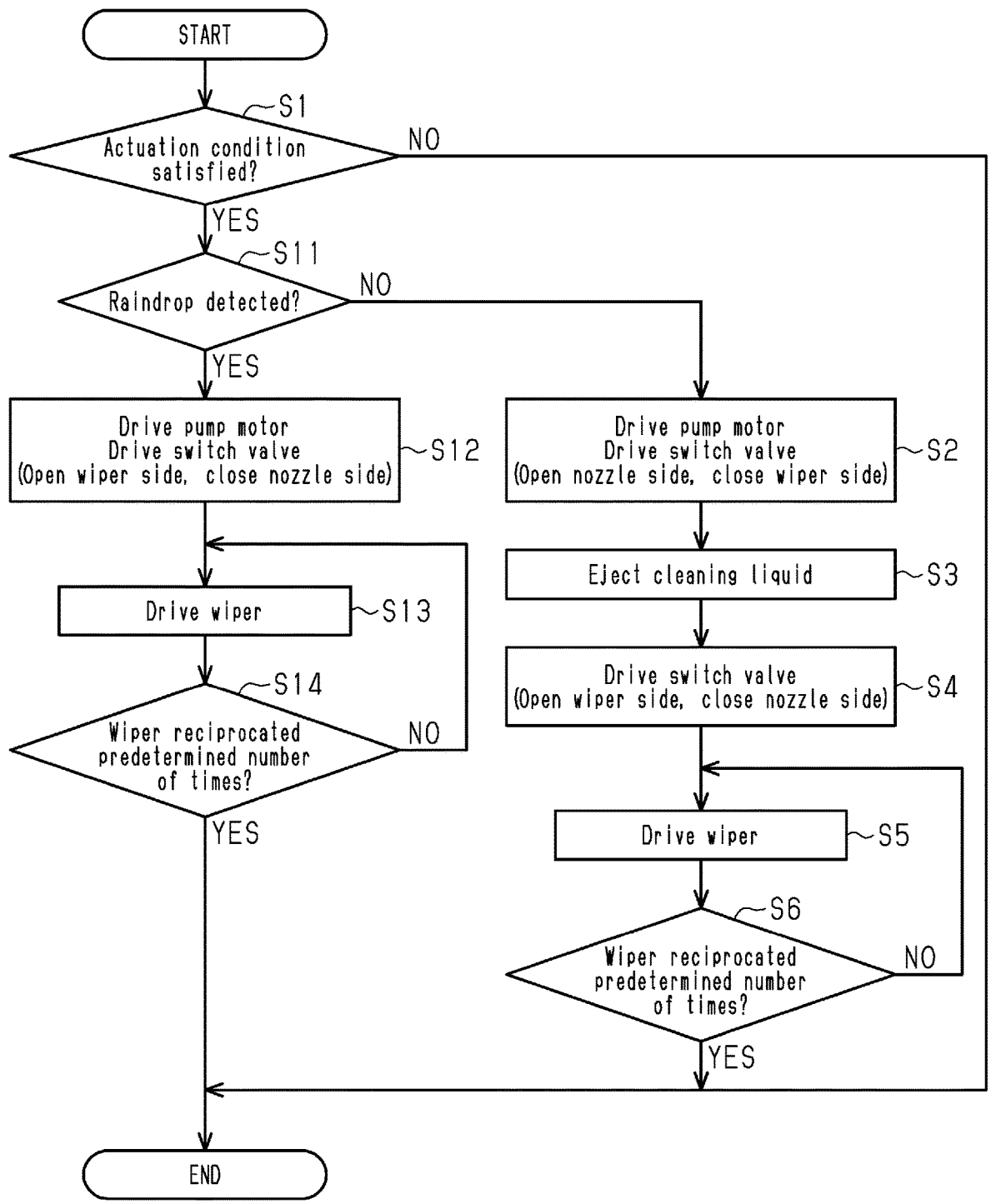
FIG. 11 is a flowchart showing a control mode of a fourth embodiment of a vehicle cleaning device.

FIG. 11 shows a control flow of the fourth embodiment that differs from the control flow of the second embodiment shown in FIG. 9. The control subject of the fourth embodiment is the vehicle cleaning device 120a of the second embodiment.

In step S1 shown in FIG. 11, it is determined whether an actuation condition of the vehicle cleaning device 120a is satisfied. If the predetermined actuation condition is satisfied, the controller (150, 151, 152) proceeds to the next step S11 and performs raindrop detection. For example, a raindrop sensor 105 (refer to FIG. 7) arranged on the front windshield 103 is used in the raindrop detection. The raindrop detection (waterdrop detection) may be performed on the sensing surfaces 115a and 116a or other locations (e.g., optical sensors arranged in the vicinity of the sensing surfaces 115a and 116a). When a raindrop is not detected, that is, when it is determined that there is no rainfall and the cleaning liquid Ws needs to be ejected to the sensing surfaces 115a and 116a, the controller (150, 151, 152) proceeds to step S2. In the same manner as steps S2 to S6 of the second embodiment, the ejection of the cleaning liquid Ws and the wiping operation of the wiper blade 123 caused by the supply pressure of the cleaning liquid Ws are performed a number of times.

When a raindrop is detected, that is, when it is determined that the cleaning liquid Ws does not need to be ejected because the raindrop, which is a substitute for the cleaning liquid Ws, is collected on the sensing surfaces 115a and 116a, the controller (150, 151, 152) proceeds to step S12. In step S12, the pump motor 113 is driven to pressure-feed the cleaning liquid Ws, and the switch valve 127 switches the passage through which the cleaning liquid Ws is pressure-fed to open the portion extending toward the wiper devices W1 and W2 and close the portion extending toward the ejection nozzles N1 and N2 (if the passage is in this mode, the mode is maintained). Thus, the wiping operation of the wiper blade 123 is performed using the raindrop without the ejection of the cleaning liquid Ws. In the following steps S13 and S14, the wiping operation of the wiper blade 123 is performed a number of times. In the fourth embodiment, the control mode is such that unnecessary ejection of the cleaning liquid Ws is not performed when raindrops are collected on the sensing surfaces 115a and 116a.

The advantage of the fourth embodiment will now be described. The fourth embodiment obtains advantages similar to the advantages (2-1) to (2-5) of the second embodiment.

(4-1) The ECU 150 (ECUs 151 and 152) determines whether the cleaning liquid Ws needs to be ejected to the sensing surfaces 115a and 116a, which are the cleaning subjects, based on the raindrop detection of the raindrop sensor 105 mounted on the vehicle 101. When the ejection is unnecessary, the ECU 150 (ECUs 151 and 152) prohibits the ejection of the cleaning liquid Ws and controls the pump motor 113 and the switch valve 127 so that the wiping operation of the wiper blade 123 is mainly performed. That is, when raindrops, which are a substitute for the cleaning liquid Ws, are collected on the sensing surfaces 115a and 116a, the wiping operation of the wiper blade 123 is performed using the raindrops without the ejection of the cleaning liquid Ws. This reduces the consumption amount of the cleaning liquid Ws.

The second to fourth embodiments may be modified as follows. The second to fourth embodiments and the following modified examples can be combined as long as the combined modified examples remain technically consistent with each other.

The optical sensors 115 and 116 used in the ranging system (LIDAR) are arranged on the front end central portion of the vehicle 101 and the rear end central portion of the vehicle 101. Instead, the optical sensors 115 and 116 may be arranged on the right surface and the left surface of the vehicle 101.

The sensing surfaces 115a and 116a of the optical sensors 115 and 116 used in the ranging system (LIDAR) are cleaning subjects. However, there is no limitation to this configuration. The cleaning subject may be, for example, an onboard camera as an optical sensor that captures an image of the surroundings of the vehicle 101, an onboard sensor other than an optical sensor, and the headlight 106, the taillamp 107, and the mirror 108 that are different from sensors and shown in FIG. 7.

Each of the wiper drivers 124a and 124b includes the drive cylinder 125, the urging spring 126, the movement converter 130, the Bourdon tube 131, and the movement converter 132. However, the configuration may be appropriately changed as long as the wiper blade 123 is configured to perform the wiping operation based on the driving by the supply pressure of the cleaning liquid Ws.

The wiper devices W1 and W2 are arranged at an upper side of the sensing surfaces 115a and 116a, and the ejection nozzles N1 and N2 are arranged at a lower side of the sensing surfaces 115a and 116a. The arrangement positions may be appropriately changed.

As an example of the actuation condition of the cleaning devices 120a and 120b, the ignition switch of the vehicle 101 being activated (IG activated), the actuation switch of the vehicle cleaning device 120a being activated (cleaning activated), and presence of an extraneous object on the sensing surfaces 115a and 116a (object present) are described. However, the actuation condition may be appropriately changed. The cleaning may be automatically and regularly performed.

The ejection nozzles N1 and N2 are arranged so that at least the ejection ports Nx constantly project to the exterior of the vehicle 101 from the sensing surfaces 115a and 116a. However, there is no limitation to this configuration. For example, the ejection nozzles may be pop-up nozzles that project in a vehicle exterior direction when receiving supply pressure of the cleaning liquid, eject the cleaning liquid, and then retract in an interior direction of the vehicle 101 when receiving urging force of a coil spring. In this case, when the cleaning liquid is not ejected, the ejection nozzles do not project to the exterior of the vehicle. This improves the appearance of the vehicle exterior.

The first embodiment, the modified examples of the first embodiment, the second to fourth embodiments, and the modified examples of the second to fourth embodiments can be combined as long as the combination remains technically consistent with each other.

The present disclosure is described in accordance with exemplified examples but is not limited to the exemplified examples and its structure. The present disclosure embraces various modified examples and variations within the scope of equivalents. In addition, various combinations and forms, and other combinations and forms including only one element or more or less than one element are also within the scope and spirit of the present disclosure.

The invention claimed is:

1. A vehicle cleaning device that removes an extraneous object collected on a cleaning subject of a vehicle, the vehicle cleaning device comprising:
    a cleaning liquid supply device mounted on the vehicle; and
    a wiper device including a wiper driver and a wiper blade that is arranged to be contactable with the cleaning subject, wherein:
    the wiper driver includes
        a linear movement portion that produces a linear movement based on supply of a cleaning liquid that is pressure-fed from the cleaning liquid supply device, and
        a movement converter that converts the linear movement into a pivoting movement, the movement converter and the linear movement portion being arranged beside each other at a pivot point of the wiper blade;
    the wiper device is configured to cause the wiper blade to perform a reciprocal wiping operation based on the pivoting movement of the movement converter;
    the linear movement portion includes:
        a piston that receives a pressure of the cleaning liquid that is pressure-fed from the cleaning liquid supply device and performs linear movement, and
        a shaft member that is coupled to the piston (i) for linear movement with the piston and (ii) to be rotatable relative to the piston; and
    the movement converter includes
        a conversion member that converts the linear movement of the shaft member into a rotation movement of the shaft member, and
        a drive member that is coupled to the wiper blade and is rotatable integrally with the shaft member.

2. The vehicle cleaning device according to claim 1, wherein
    the linear movement portion includes an urging spring and is configured to perform a reciprocal linear movement,
    the linear movement to one side is performed to accumulate urging force in the urging spring based on the supply of the cleaning liquid, and
    the linear movement to the other side is performed by receiving urging force accumulated in the urging spring based on a stopping of the supply of the cleaning liquid.

3. The vehicle cleaning device according to claim 1, further comprising:
    an ejection nozzle that ejects and supplies the cleaning liquid, which is pressure-fed from the cleaning liquid supply device, to the cleaning subject.

4. The vehicle cleaning device according to claim 3, further comprising:
    a switch that switches the supply of the cleaning liquid pressure-fed from the cleaning liquid supply device to the ejection nozzle or to the wiper driver.

5. The vehicle cleaning device according to claim 3, wherein the ejection nozzle is located at a vertically lower side of the wiper blade.

6. The vehicle cleaning device according to claim 1, wherein the cleaning subject of the vehicle includes a sensing surface of a ranging sensor mounted on the vehicle.

7. The vehicle cleaning device according to claim 2, wherein the urging spring is located between the drive member and the shaft member.

8. The vehicle cleaning device according to claim 1, wherein
the drive member is coupled to the shaft member to be linearly movable and integrally rotatable.

\* \* \* \* \*